United States Patent
Asano et al.

(10) Patent No.: US 11,286,370 B2
(45) Date of Patent: Mar. 29, 2022

(54) SOLVENT-FREE ACRYLIC RESIN COMPOSITION, SOLVENT-FREE ACRYLIC ADHESIVE USING SAME, ADHESIVE SHEET, AND PRODUCTION METHOD FOR SOLVENT-FREE ACRYLIC RESIN COMPOSITION

(71) Applicant: Mitsubishi Chemical Corporation, Tokyo (JP)

(72) Inventors: Tetsuya Asano, Tokyo (JP); Takahiro Nakashima, Tokyo (JP); Kazuki Nohara, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/845,548

(22) Filed: Apr. 10, 2020

(65) Prior Publication Data
US 2020/0239749 A1 Jul. 30, 2020

Related U.S. Application Data

(63) Continuation of application No. PCT/JP2018/041889, filed on Nov. 13, 2018.

(30) Foreign Application Priority Data

Dec. 19, 2017 (JP) .............................. JP2017-242925

(51) Int. Cl.
| | | |
|---|---|---|
| C08K 5/29 | (2006.01) | |
| C08J 3/24 | (2006.01) | |
| C08J 5/12 | (2006.01) | |
| C08F 220/28 | (2006.01) | |
| C08F 220/18 | (2006.01) | |
| C09J 133/14 | (2006.01) | |

(52) U.S. Cl.
CPC .......... *C08K 5/29* (2013.01); *C08F 220/1808* (2020.02); *C09J 133/14* (2013.01)

(58) Field of Classification Search
None
See application file for complete search history.

(56) References Cited

U.S. PATENT DOCUMENTS

| 4,113,676 A * | 9/1978 | Niederst ................ C08K 5/29 524/195 |
| 2012/0064339 A1* | 3/2012 | Yamagata .............. C09J 171/02 428/355 AC |
| 2014/0030511 A1 | 1/2014 | Amano et al. |
| 2014/0322440 A1 | 10/2014 | Nonaka et al. |

FOREIGN PATENT DOCUMENTS

| CN | 103476890 A | 12/2013 |
| JP | 2013-116983 A | 6/2013 |
| JP | 2014-214280 | 11/2014 |
| JP | 2016-035046 A | 3/2016 |
| JP | 2017-039857 A | 2/2017 |
| JP | 2017-210610 A | 11/2017 |
| JP | 2018-070789 A | 5/2018 |
| WO | 2014/167890 A | 10/2014 |

OTHER PUBLICATIONS

ISR issued in WIPO Patent Application No. PCT/JP2018/041889, dated Feb. 12, 2019, English translation.
IPRP issued in WIPO Patent Application No. PCT/JP2018/041889, dated Jun. 23, 2020, English translation.
Office Action issued in CN Patent Application No. 201880067820.9, dated Oct. 20, 2021, English translation.

* cited by examiner

*Primary Examiner* — Tae H Yoon
(74) *Attorney, Agent, or Firm* — Greenblum & Bernstein, P.L.C.

(57) ABSTRACT

A solvent-free acrylic resin composition includes an acrylic resin (A), wherein the acrylic resin (A) contains 5 wt. % to 60 wt. % of a structural moiety derived from a hydroxy group-containing monomer (a1), and an acid value in the resin composition is from 0.001 mgKOH/g to 0.3 mgKOH/g. The solvent-free acrylic resin composition is suppressed in viscosity rise due to heating, and is hence excellent in thermal stability; the composition can be thickly applied when used as an adhesive; and the composition can provide an adhesive excellent in step followability, corrosion resistance, and moist-heat haze resistance.

6 Claims, No Drawings

SOLVENT-FREE ACRYLIC RESIN COMPOSITION, SOLVENT-FREE ACRYLIC ADHESIVE USING SAME, ADHESIVE SHEET, AND PRODUCTION METHOD FOR SOLVENT-FREE ACRYLIC RESIN COMPOSITION

RELATED APPLICATION

This application is a continuation of International Application No. PCT/JP2018/041889, filed on Nov. 13, 2018, which claims priority to Japanese Patent Application No. 2017-242925, filed on Dec. 19, 2017, the entire contents of each of which being hereby incorporated by reference.

TECHNICAL FIELD

The present disclosure relates to a solvent-free acrylic resin composition and a solvent-free acrylic adhesive obtained by using the solvent-free acrylic resin composition, an adhesive sheet, and a production method for a solvent-free acrylic resin composition, and more specifically, to a solvent-free acrylic resin composition that is suppressed in viscosity rise due to heating, and is hence excellent in thermal stability.

BACKGROUND ART

In recent years, in a television or a monitor for a personal computer, or a mobile device, such as a laptop personal computer, a cellular phone, or a tablet terminal, in normal cases, a protective layer formed from a plastic sheet or the like has been arranged on the viewer side of a liquid crystal display, and a space (air layer) has been arranged between the liquid crystal display and the protective layer for preventing the breakage of the liquid crystal display due to external impact.

However, there is a problem in that reflection occurs at each of an interface between the protective layer and the air layer, and an interface between the air layer and the liquid crystal display to cause a reduction in visibility of the display.

In view of the foregoing, in recent years, an impact-absorbing adhesive layer has been used instead of the air layer for the purposes of improving the visibility and thinning the mobile device (plastic sheet) while securing impact resistance.

In order for the adhesive layer to exhibit sufficient impact-absorbing performance, the layer needs to have some degree of thickness. However, when a solvent-type acrylic adhesive that has heretofore been generally used is used in a thick-coating application, the thickness of the adhesive layer at the time of its application is large, and hence the following problems occur. Application dripping occurs, or the solvent of the adhesive hardly volatilizes in a drying step after the application, and hence the solvent remains as bubbles in the adhesive layer.

To cope with the problems, the use of a solvent-free adhesive has been proposed, and a hot melt-type adhesive and an active energy ray-curable adhesive have been proposed (e.g., PTL 1).

Of such solvent-free adhesives, hot melt-type adhesive does not require any drying step for volatilizing its solvent after its application, and hence can efficiently provide an adhesive layer in a short time period even when thickly applied. In addition, hot melt-type adhesive is often used without being blended with any active energy ray-curable monomer, and in such cases, a curing step based on irradiation with an active energy ray is not essential. Accordingly, a thick adhesive layer can be more efficiently obtained.

RELATED ART DOCUMENT

Patent Document

PTL 1: JP-A-2014-214280

SUMMARY

However, hot melt-type adhesive has no fluidity at normal temperature (23° C.), and hence typically needs to be applied after having been heated to from about 100° C. to about 150° C. In this connection, when a hot melt-type adhesive using a solvent-free acrylic resin is subjected to a high-temperature condition, a carboxyl group is introduced into the acrylic resin by the presence of, for example, acrylic acid remaining in a trace amount in a residual monomer or a residual catalyst at the time of the production of the adhesive to be incorporated into the acrylic resin, in particular, an acrylic monomer serving as a raw material, among others, a hydroxy group-containing monomer, and under the influence of such carboxyl group and a hydroxy group, the following problems have occurred: crosslinking or the like of the acrylic resin occurs at the time of the application of heat to the resin to increase its molecular weight, thereby reducing the applicability of the adhesive; or an adhesive satisfying desired physical properties is not obtained. Acrylic acid often remains as an impurity in the hydroxy group-containing monomer, although attention has not heretofore been paid to the fact to a very large extent; for example, the content of the impurity is from about 0.001 wt. % to about 0.5 wt. %.

In addition, in a hot melt-type adhesive using the solvent-free acrylic resin, haze under a moist-heat environment has not been considered.

In view of the foregoing, in the present disclosure, a solvent-free acrylic resin composition having the following features is provided: the composition is suppressed in viscosity rise due to heating, and is hence excellent in thermal stability; the composition can be thickly applied when used as an adhesive; and the composition can provide an adhesive excellent in step followability, corrosion resistance, and suppression of haze under a moist-heat environment (hereinafter also referred to as "moist-heat haze resistance").

To obtain such composition, the inventors have made extensive investigations in view of such circumstances, and as a result, have found that, when the acid value of an acrylic resin having a structural moiety derived from a hydroxy group-containing monomer in a solvent-free acrylic resin composition is reduced as compared to a typical value, the following features are achieved: the composition can be suppressed in viscosity rise due to heating, and is hence excellent in thermal stability and excellent in handleability at the time of its production; and the composition can be thickly applied when used as an adhesive, and the adhesive is excellent in step followability, corrosion resistance, and moist-heat haze resistance.

That is, the gist of the present disclosure relates to a solvent-free acrylic resin composition, including an acrylic resin (A), wherein the acrylic resin (A) contains 5 wt. % to 60 wt. % of a structural moiety derived from a hydroxy group-containing monomer (a1), and an acid value in the resin composition is from 0.001 mgKOH/g to 0.3 mgKOH/g.

Further, the present disclosure provides a solvent-free acrylic adhesive, which is obtained by using the solvent-free acrylic resin composition, and an adhesive sheet, including an adhesive layer obtained by using the solvent-free acrylic resin composition, and a production method for a solvent-free acrylic resin composition.

The present disclosure provides the solvent-free acrylic resin composition, including the acrylic resin (A), wherein the acrylic resin (A) contains 5 wt. % to 60 wt. % of the structural moiety derived from the hydroxy group-containing monomer (a1), and the acid value in the resin composition is from 0.001 mgKOH/g to 0.3 mgKOH/g. Accordingly, the solvent-free acrylic resin composition can be suppressed in viscosity rise due to heating, and is hence excellent in thermal stability, and can be thickly applied, and the solvent-free acrylic adhesive obtained by using the solvent-free acrylic resin composition is excellent in step followability and corrosion resistance, and is also excellent in moist-heat haze resistance. In addition, the solvent-free acrylic adhesive obtained by using the solvent-free acrylic resin composition is particularly useful as an adhesive or an adhesive sheet to be used in each of, for example, a touch panel and an image display apparatus.

When the solvent-free acrylic resin composition of the present disclosure further includes a carbodiimide compound (B), the composition becomes further improved in thermal stability.

Of the compositions of the present disclosure, in particular, the composition satisfying the following condition becomes further improved in thermal stability: the carbodiimide compound (B) is a monocarbodiimide compound (b1).

Of the compositions of the present disclosure, in particular, the composition satisfying the following condition can be excellent in adhesive force: the acrylic resin (A) contains 5 wt. % to 40 wt. % of a structural moiety derived from at least one (meth)acrylate selected from the group consisting of methyl (meth)acrylate and ethyl (meth)acrylate.

Of the compositions of the present disclosure, in particular, the composition satisfying the following condition can be excellent in endurance reliability: the acrylic resin (A) has a weight-average molecular weight of 50,000 or more.

In addition, the production method for a solvent-free acrylic resin composition of the present disclosure includes mixing an acrylic resin (A), which contains 5 wt. % to 60 wt. % of a structural moiety derived from a hydroxy group-containing monomer (a1), and which has an acid value of from 0.001 mgKOH/g to 2 mgKOH/g, and a carbodiimide compound (B) at from 0° C. to 140° C. Accordingly, the solvent-free acrylic resin composition to be obtained can be suppressed in viscosity rise due to heating, and is hence excellent in thermal stability, and can be thickly applied, and the solvent-free acrylic adhesive obtained by using the solvent-free acrylic resin composition is excellent in step followability and corrosion resistance, and is also excellent in moist-heat haze resistance.

DESCRIPTION OF EMBODIMENTS

The present disclosure is described in detail below. However, the following description describes an example of a desired embodiment of the present disclosure.

In the present disclosure, the term "(meth)acryl" means acryl or methacryl, the term "(meth)acryloyl" means acryloyl or methacryloyl, and the term "(meth)acrylate" means an acrylate or a methacrylate.

A solvent-free acrylic resin composition of the present disclosure includes an acrylic resin (A), and has a feature in that an acid value in such solvent-free acrylic resin composition is from 0.001 mgKOH/g to 0.3 mgKOH/g. In addition, the composition of the present disclosure also has a feature in that the acrylic resin (A) contains therein 5 wt. % to 60 wt. % of a structural moiety derived from a hydroxy group-containing monomer (a1).

In the present disclosure, "solvent-free acrylic resin composition" means that a solvent content in the resin composition is 2 wt. % or less when the resin composition is in a state before being turned into an adhesive sheet, that is, before being applied.

<Acrylic Resin (A)>

First, the acrylic resin (A) to be incorporated as an essential component into the solvent-free acrylic resin composition of the present disclosure is described.

The acrylic resin (A) to be used in the present disclosure is obtained by polymerizing polymerization components containing the hydroxy group-containing monomer (a1), and may preferably further contain, as a polymerization component, at least one kind of copolymerizable monomer (a2) selected from a (meth)acrylic acid alkyl ester monomer and a vinyl ester monomer each having an alkyl group having 5 to 14 carbon atoms, at least one kind of copolymerizable monomer (a3) selected from a (meth)acrylic acid alkyl ester monomer and a vinyl ester monomer each having an alkyl group having 1 to 4 carbon atoms (provided that the monomers (a1) and (a2) are excluded), or as required, a functional group-containing ethylenically unsaturated monomer (a4) (provided that the monomer (a1) is excluded) or any other copolymerizable monomer (a5).

<Hydroxy Group-Containing Monomer (a1)>

Examples of the hydroxy group-containing monomer (a1) may include: hydroxy (meth)acrylates, such as 2-hydroxyethyl (meth)acrylate, 4-hydroxybutyl (meth)acrylate, 5-hydroxypentyl (meth)acrylate, 6-hydroxyhexyl (meth)acrylate, and 8-hydroxyoctyl (meth)acrylate; caprolactone-modified monomers, such as caprolactone-modified 2-hydroxyethyl (meth)acrylate; oxyalkylene-modified monomers, such as diethylene glycol (meth)acrylate and polyethylene glycol (meth)acrylate; primary hydroxy group-containing monomers, such as 2-acryloyloxyethyl-2-hydroxyethyl phthalate; secondary hydroxy group-containing monomers, such as 2-hydroxypropyl (meth)acrylate, 2-hydroxybutyl (meth)acrylate, and 3-chloro-2-hydroxypropyl (meth)acrylate; and tertiary hydroxy group-containing monomers, such as 2,2-dimethyl-2-hydroxyethyl (meth)acrylate. Those monomers may be used alone or in combination thereof.

Of the hydroxy group-containing monomers (a1), 2-hydroxyethyl (meth)acrylate, 4-hydroxybutyl (meth)acrylate, and 2-hydroxypropyl (meth)acrylate are particularly preferably used because the balance of moist-heat resistance and heat resistance is excellent.

A monomer in which the content ratio of a di(meth)acrylate serving as an impurity is 0.5 wt. % or less is preferably used as the hydroxy group-containing monomer to be used in the present disclosure, and a monomer in which the content ratio is 0.2 wt. % or less is particularly preferred, and a monomer in which the content ratio is 0.1 wt. % or less is further preferred.

In addition, the hydroxy group-containing monomer (a1) often contains therein acrylic acid as an impurity. The content of the impurity is typically from about 0.001 wt. % to about 0.5 wt. %, and a monomer having a smaller content of the impurity is preferably used.

In the present disclosure, the content of the hydroxy group-containing monomer (a1) needs to be from 5 wt. % to 60 wt. % with respect to the entirety of the polymerization components, and the content is preferably from 8 wt. % to 45 wt. %, particularly preferably from 10 wt. % to 40 wt. %, further preferably from 12 wt. % to 35 wt. %, further particularly preferably from 15 wt. % to 30 wt. %.

When such content is excessively small, the moist-heat resistance of the solvent-free acrylic resin composition at the time of its use as an adhesive tends to reduce, and when the content is excessively large, the self-crosslinking reaction of the acrylic resin (A) tends to be liable to occur to reduce the heat resistance of the composition.

<At Least One Kind of Copolymerizable Monomer (a2) Selected from (Meth)Acrylic Acid Alkyl Ester Monomer and Vinyl Ester Monomer Each Having Alkyl Group Having 5 to 14 Carbon Atoms>

In the present disclosure, a copolymerizable monomer having such a structure that hydrogen abstraction easily occurs under a high-energy state, such as high temperature or UV irradiation, and as a result, a crosslinkage is easily formed is preferably further incorporated as a polymerization component. Among others, the at least one kind of copolymerizable monomer (a2) selected from the (meth) acrylic acid alkyl ester monomer and the vinyl ester monomer each having an alkyl group having 5 to 14 carbon atoms is particularly preferably incorporated, and a (meth)acrylic acid alkyl ester monomer having an alkyl group having 5 to 14 carbon atoms, the alkyl group having a branched structure, is further preferred, and 2-ethylhexyl (meth)acrylate or isononyl (meth)acrylate is further particularly preferred. Those monomers may be used alone or in combination thereof.

In the present disclosure, the content of the copolymerizable monomer (a2) is preferably from 15 wt. % to 85 wt. with respect to the entirety of the polymerization components, and the content is particularly preferably from 20 wt. % to 80 wt. %, further preferably from 30 wt. % to 75 wt. %, further particularly preferably from 40 wt. % to 70 wt. %, most preferably from 45 wt. % to 65 wt. %.

When such content is excessively small, the step followability or durability of the solvent-free acrylic resin composition at the time of its use as an adhesive tends to reduce. Meanwhile, when the content of the copolymerizable monomer (a2) is excessively large, the adhesive force of the composition at the time of its use as an adhesive tends to reduce.

<At Least One Kind of Copolymerizable Monomer (a3) Selected from (Meth)Acrylic Acid Alkyl Ester Monomer and Vinyl Ester Monomer Each Having Alkyl Group Having 1 to 4 Carbon Atoms>

In the present disclosure, the at least one kind of copolymerizable monomer (a3) selected from the (meth)acrylic acid alkyl ester monomer and the vinyl ester monomer each having an alkyl group having 1 to 4 carbon atoms (provided that the monomers (a1) and (a2) are excluded) is preferably further incorporated as a polymerization component because the cohesive force of the solvent-free acrylic resin composition is improved, and the adhesive force thereof at the time of its turning into an adhesive is improved. Examples of the copolymerizable monomer (a3) include methyl (meth)acrylate, ethyl (meth)acrylate, n-butyl (meth)acrylate, t-butyl (meth)acrylate, isobutyl (meth)acrylate, n-propyl (meth) acrylate, isopropyl (meth)acrylate, vinyl propionate, and vinyl acetate.

Of the copolymerizable monomers (a3), methyl (meth) acrylate, ethyl (meth)acrylate, or t-butyl (meth)acrylate is preferably used because the cohesive force of the solvent-free acrylic resin composition in the case of its use as an adhesive is improved.

Of the copolymerizable monomers (a3), at least one (meth)acrylate (a3-1) selected from the group consisting of methyl (meth)acrylate and ethyl (meth)acrylate is preferably used because the effects of the present disclosure are further exhibited.

Those copolymerizable monomers (a3) may be used alone or in combination thereof.

The content of the copolymerizable monomer (a3) is preferably from 5 wt. % to 70 wt. %, particularly preferably from 10 wt. % to 60 wt. %, further preferably from 15 wt. % to 45 wt. % with respect to the entirety of the polymerization components. When the content of the copolymerizable monomer (a3) is excessively small, the adhesive force of the solvent-free acrylic resin composition in the case of its use as an adhesive tends to reduce, and when the content is excessively large, durability in the case where the acrylic resin (A) having a small molecular weight is used as an adhesive tends to reduce.

In addition, when the at least one (meth)acrylate (a3-1) selected from the group consisting of methyl (meth)acrylate and ethyl (meth)acrylate out of the components (a3) is used, its content is preferably from 5 wt. % to 40 wt. %, particularly preferably from 7 wt. % to 30 wt. %, further preferably from 10 wt. % to 20 wt. % with respect to the entirety of the polymerization components. When the content of the (meth) acrylate (a3-1) is excessively large, the handleability of the solvent-free acrylic resin composition at the time of its processing tends to reduce owing to a rise in viscosity thereof, and when the content is excessively small, the adhesive force thereof at the time of its use as an adhesive tends to reduce.

<Functional Group-Containing Ethylenically Unsaturated Monomer (a4)>

In the present disclosure, examples of the functional group-containing ethylenically unsaturated monomer (a4) (provided that the monomer (a1) is excluded) include a functional group-containing monomer having a nitrogen atom, an acetoacetyl group-containing monomer, an isocyanate group-containing monomer, and a glycidyl group-containing monomer.

Of those, the functional group-containing monomer having a nitrogen atom is preferred because the monomer imparts a cohesive force and a crosslinking-accelerating action to the acrylic resin, and an amino group-containing monomer or an amide group-containing monomer is particularly preferred, and the amino group-containing monomer is further preferred.

Examples of the amino group-containing monomer include: primary amino group-containing (meth)acrylates, such as aminomethyl (meth)acrylate and aminoethyl (meth) acrylate; secondary amino group-containing (meth)acrylates, such as t-butylaminoethyl (meth)acrylate and t-butylaminopropyl (meth)acrylate; and tertiary amino group-containing (meth)acrylates, such as ethylaminoethyl (meth) acrylate, dimethylaminoethyl (meth)acrylate, diethylaminoethyl (meth)acrylate, dimethylaminopropyl (meth)acrylate, diethylaminopropyl (meth)acrylate, and dimethylaminopropylacrylamide.

Examples of the amide group-containing monomer include: (meth)acrylamide; N-alkyl(meth)acrylamides, such as N-methyl(meth)acrylamide, N-ethyl(meth)acrylamide, N-propyl(meth)acrylamide, N-n-butyl(meth)acrylamide, diacetone (meth)acrylamide, and N,N'-methylenebis(meth)acrylamide; N,N-dialkyl(meth)acrylamides, such as N,N-dimethyl(meth)acrylamide, N,N-diethyl(meth)acrylamide, N,N-dipropyl(meth)acrylamide, N,N-ethylmethylacrylamide, and N,N-diallyl(meth)acrylamide; hydroxyalkyl(meth) acrylamides, such as N-hydroxymethyl(meth)acrylamide and N-hydroxyethyl(meth)acrylamide; and alkoxyalkyl (meth)acrylamides, such as N-methoxymethyl(meth)acrylamide and N-(n-butoxymethyl) (meth)acrylamide.

Examples of the acetoacetyl group-containing monomer include 2-(acetoacetoxy)ethyl (meth)acrylate and allyl acetoacetate.

Examples of the isocyanate group-containing monomer include 2-acryloyloxyethyl isocyanate, 2-methacryloyloxyethyl isocyanate, and alkylene oxide adducts thereof.

Examples of the glycidyl group-containing monomer include glycidyl (meth)acrylate and allylglycidyl (meth)acrylate.

Those functional group-containing ethylenically unsaturated monomers (a4) may be used alone or in combination thereof.

The content of the functional group-containing ethylenically unsaturated monomer (a4) is preferably 30 wt. % or less, particularly preferably 20 wt. % or less, further preferably 10 wt. % or less, further particularly preferably 5 wt. % or less with respect to the entirety of the polymerization components. When the content of the functional group-containing ethylenically unsaturated monomer (a4) is excessively large, the heat resistance of the resin tends to reduce.

<Other Copolymerizable Monomer (a5)>

In the present disclosure, examples of the other copolymerizable monomer (a5) include: aromatic (meth)acrylic acid ester monomers, such as phenyl (meth)acrylate, benzyl (meth)acrylate, phenoxyethyl (meth)acrylate, phenyl diethylene glycol (meth)acrylate, phenoxypolyethylene glycol (meth)acrylate, phenoxypolyethylene glycol-polypropylene glycol-(meth)acrylate, and nonylphenol ethylene oxide adduct (meth)acrylate; and monomers such as acrylonitrile, methacrylonitrile, styrene, α-methylstyrene, vinyl stearate, vinyl chloride, vinylidene chloride, an alkyl vinyl ether, vinyltoluene, vinylpyridine, vinylpyrrolidone, an itaconic acid dialkyl ester, a fumaric acid dialkyl ester, allyl alcohol, acryl chloride, methyl vinyl ketone, N-acrylamidomethyltrimethylammonium chloride, allyltrimethylammonium chloride, and dimethylallyl vinyl ketone. Those monomers may be used alone or in combination thereof.

In addition, a small amount of, for example, a compound having two or more ethylenically unsaturated groups, such as ethylene glycol di(meth)acrylate, diethylene glycol di(meth)acrylate, triethylene glycol di(meth)acrylate, polyethylene glycol di(meth)acrylate, propylene glycol di(meth)acrylate, or divinylbenzene, may also be used in combination for the purpose of achieving a high molecular weight. At this time, such compound having two or more ethylenically unsaturated groups has high reactivity, and is hence typically free from remaining without undergoing any reaction when used as a polymerization component of the acrylic resin (A). When the usage amount of such compound having two or more ethylenically unsaturated groups is excessively large, there is a tendency that the compound remains without undergoing any reaction, and hence the acrylic resin (A) gels.

The content of the other copolymerizable monomer (a5) is preferably 50 wt. % or less, particularly preferably 40 wt. % or less, further preferably 20 wt. % or less with respect to the entirety of the polymerization components. When the content ratio of the other copolymerizable monomer (a5) is excessively large, the heat resistance of the solvent-free acrylic resin composition tends to reduce, or the adhesive force thereof tends to reduce.

The acrylic resin (A) may be produced by polymerizing the polymerization components.

A conventionally known polymerization method, such as solution polymerization, suspension polymerization, bulk polymerization, or emulsion polymerization, may be used as a method of polymerizing the acrylic resin (A). In the present disclosure, however, the acrylic resin (A) is preferably produced by the solution polymerization because the resin can be produced safely, stably, and in arbitrary monomer composition.

An example of a preferred production method for the acrylic resin (A) to be used in the present disclosure is described below.

First, the polymerization components and a polymerization initiator are mixed or dropped into an organic solvent, and the mixture is subjected to solution polymerization to provide a solution of the acrylic resin (A).

[Organic Solvent]

Examples of the organic solvent to be used in the polymerization reaction include: aromatic hydrocarbons, such as toluene and xylene; aliphatic hydrocarbons, such as hexane; esters, such as ethyl acetate and butyl acetate; aliphatic alcohols, such as N-propyl alcohol and isopropyl alcohol; and ketones, such as acetone, methyl ethyl ketone, methyl isobutyl ketone, and cyclohexanone. Those organic solvents may be used alone or in combination thereof. Of those solvents, an organic solvent having a boiling point of 80° C. or less is preferably used because the acrylic resin (A) of a solvent-free type can be efficiently produced by evaporating the solvent from the solution of the acrylic resin (A) obtained by the solution polymerization.

Examples of the organic solvent having a boiling point of 80° C. or less may include: hydrocarbon solvents, such as n-hexane (67° C.); alcohol solvents, such as methanol (65° C.); ester solvents, such as ethyl acetate (77° C.) and methyl acetate (54° C.); ketone solvents, such as methyl ethyl ketone (80° C.) and acetone (56° C.); diethyl ether (35° C.); methylene chloride (40° C.); and tetrahydrofuran (66° C.). Of those, ethyl acetate, acetone, or methyl acetate is preferably used because of its general-purpose property and safety, and ethyl acetate or acetone is particularly preferably used.

A numerical value in ( ) described after the name of each of the organic solvents is a boiling point.

[Polymerization Initiator]

As the polymerization initiator to be used for the polymerization reaction, an azopolymerization initiator, a peroxide polymerization initiator, or the like serving as a typical radical polymerization initiator may be used. Examples of the azo polymerization initiator include 2,2'-azobis(2-methylbutyronitrile), 2,2'-azobisisobutyronitrile, (1-phenylethyl)azodiphenylmethane, 2,2'-azobis(2,4-dimethylvaleronitrile), 2,2'-azobis(2-cyclopropylpropionitrile), and 2,2'-azobis(4-methoxy-2,4-dimethylvaleronitrile). Examples of the peroxide polymerization initiator include benzoyl peroxide, di-t-butyl peroxide, cumene hydroperoxide, lauroyl peroxide, t-butyl peroxypivalate, t-hexyl peroxypivalate, t-hexyl peroxyneodecanoate, diisopropyl peroxycarbonate, and diisobutyryl peroxide. Those polymerization initiators may be used alone or in combination thereof.

In the production of the acrylic resin (A) of the present disclosure, the solution polymerization is preferably performed by using a solvent having a boiling point of 80° C. or less as a reaction solvent for the polymerization at a relatively low temperature. When a polymerization initiator having a high 10-hour half-life temperature is used at this time, the polymerization initiator is liable to remain, and when the polymerization initiator remains, the gelation of the acrylic resin (A) tends to occur in a step of evaporating the solvent from the solution of the acrylic resin (A) to be described later.

Therefore, in the present disclosure, a polymerization initiator having a 10-hour half-life temperature of 60° C. or less is preferably used out of the polymerization initiators because the step of evaporating the solvent from the solution of the acrylic resin (A) obtained in the solution polymerization can be stably performed. Of those, 2,2'-azobis(2,4-dimethylvaleronitrile) (52° C.), 2,2'-azobis(2-cyclopropyl-propionitrile) (49.6° C.), 2,2'-azobis(4-methoxy-2,4-dimethylvaleronitrile) (30° C.), t-butyl peroxypivalate (54.6° C.), t-hexyl peroxypivalate (53.2° C.), t-hexyl peroxyneodecanoate (44.5° C.), diisopropyl peroxycarbonate (40.5° C.), and diisobutyryl peroxide (32.7° C.) are particularly preferred, and 2,2'-azobis(2,4-dimethylvaleronitrile) (52° C.) and t-hexyl peroxypivalate (53.2° C.) are further preferred.

A numerical value in ( ) described after the name of each of the compounds is the 10-hour half-life temperature of the compound.

The usage amount of the polymerization initiator is typically from 0.001 parts by weight to 10 parts by weight, preferably from 0.1 parts by weight to 8 parts by weight, particularly preferably from 0.5 parts by weight to 6 parts by weight, further preferably from 1 part by weight to 4 parts by weight, further particularly preferably from 1.5 parts by weight to 3 parts by weight, most preferably from 2 parts by weight to 2.5 parts by weight with respect to 100 parts by weight of the polymerization components. When the usage amount of the polymerization initiator is excessively small, the polymerization ratio of the acrylic resin (A) tends to reduce to increase the amount of a residual monomer or to increase the weight-average molecular weight of the acrylic resin (A). When the usage amount is excessively large, the gelation of the acrylic resin (A) tends to occur in the step of evaporating the solvent from the solution of the acrylic resin (A) to be described later.

[Polymerization Conditions and the Like]

With regard to polymerization conditions for the solution polymerization, the polymerization only needs to be performed in accordance with conventionally known polymerization conditions, and for example, the following may be performed: the polymerization components and the polymerization initiator are mixed or dropped into the solvent, and the mixture is subjected to the polymerization under predetermined polymerization conditions.

A polymerization temperature in the polymerization reaction is typically from 40° C. to 120° C. In the present disclosure, however, the polymerization temperature is preferably from 50° C. to 90° C. because the reaction can be stably performed, and the polymerization temperature is particularly preferably from 55° C. to 75° C., further preferably from 60° C. to 70° C. When the polymerization temperature is excessively high, the acrylic resin (A) tends to be liable to gel, and when the polymerization temperature is excessively low, the activity of the polymerization initiator reduces, and hence the polymerization ratio of the resin tends to reduce to increase the amount of a residual monomer.

In addition, a polymerization time in the polymerization reaction (when last spurt heating to be described later is performed, a time till the start of the last spurt heating) is not particularly limited, but is preferably 0.5 hours or more, particularly preferably 1 hour or more, further preferably 2 hours or more, further particularly preferably 5 hours or more from the final addition of the polymerization initiator. The upper limit of the polymerization time is typically 72 hours.

The polymerization reaction is preferably performed while the solvent is refluxed because heat removal is easily performed.

In the production of the acrylic resin (A) of the present disclosure, in order to reduce the amount of the residual polymerization initiator, the last spurt heating is preferably performed to thermally decompose the polymerization initiator.

The last spurt heating is preferably performed at a temperature higher than the 10-hour half-life temperature of the polymerization initiator. Specifically, the temperature is typically from 40° C. to 150° C., and is preferably from 55° C. to 130° C., particularly preferably from 75° C. to 95° C. in terms of the suppression of the gelation of the acrylic resin (A). When the temperature of the last spurt heating is excessively high, the acrylic resin (A) tends to yellow, and when the temperature is excessively low, the polymerization components and the polymerization initiator tend to remain to reduce the temporal stability and thermal stability of the acrylic resin (A).

Thus, the solution of the acrylic resin (A) can be obtained.

Next, the solvent is evaporated from the resultant solution of the acrylic resin (A).

The step of evaporating the solvent from the solution of the acrylic resin (A) may be performed by a known general method, and for example, a method involving heating the solvent to evaporate the solvent, or a method involving reducing a pressure to evaporate the solvent is available as a method of evaporating the solvent; a method involving heating the solvent under reduced pressure to evaporate the solvent is preferred because the evaporation of the solvent is efficiently performed.

When the solvent is evaporated through heating, the evaporation is preferably performed at a temperature of from 60° C. to 150° C., and the following is particularly preferably performed because the amount of the residual solvent is extremely reduced: the solvent is distilled out while the reaction solution after the polymerization of the acrylic resin (A) is held at from 60° C. to 80° C., followed by the distilling-out of the solvent at from 80° C. to 150° C. In terms of the suppression of the gelation of the acrylic resin (A), it is preferred that the solvent evaporation be not performed at a temperature of more than 150° C.

When the solvent is evaporated through a pressure reduction, the evaporation is preferably performed at a pressure of from 20 kPa to 101.3 kPa, and the following is particularly preferably performed because the amount of the residual solvent is extremely reduced: the solvent in the reaction solution is distilled out while the reaction solution is held at a pressure in the range of from 50 kPa to 101.3 kPa, followed by the distilling-out of the residual solvent at from 0 kPa to 50 kPa.

Thus, the acrylic resin (A) to be used in the present disclosure can be produced.

Such acrylic resin (A) contains the structural moiety derived from the hydroxy group-containing monomer (a1), and the content of the structural moiety derived from the hydroxy group-containing monomer (a1) in the acrylic resin (A) is from 5 wt. % to 60 wt. %, preferably from 8 wt. % to 45 wt. %, particularly preferably from 10 wt. % to 40 wt. %, further preferably from 12 wt. % to 35 wt. %, further particular preferably from 15 wt. % to 30 wt. %.

In addition, in normal cases, the acrylic resin (A) preferably contains a structural moiety derived from the at least one (meth)acrylate (a3-1) selected from the group consisting of methyl (meth)acrylate and ethyl (meth)acrylate in addition to the structural moiety derived from the hydroxy group-containing monomer (a1), and such structural moiety derived from the (meth)acrylate (a3-1) is incorporated at particularly preferably from 5 wt. % to 40 wt. %, further preferably from 7 wt. % to 30 wt. %, further particularly preferably from 10 wt. % to 20 wt. % with respect to the acrylic resin (A).

Herein, the ratio (composition ratio) of the structural moiety derived from each component in the acrylic resin (A) may be determined by, for example, NMR.

The acid value of the acrylic resin (A) is preferably from 0.001 mgKOH/g to 2 mgKOH/g, particularly preferably from 0.001 mgKOH/g to 1 mgKOH/g, further preferably from 0.001 mgKOH/g to 0.5 mgKOH/g. When the acid value is excessively high, the thermal stability of the resin tends to reduce.

Herein, the acid value in the present disclosure is determined by neutralization titration on the basis of JIS K 0070.

The glass transition temperature (Tg) of the acrylic resin (A) to be used in the present disclosure is preferably from −100° C. to 50° C., particularly preferably from −60° C. to 10° C., further preferably from −40° C. to 0° C., further particularly preferably from −30° C. to −10° C. When such glass transition temperature is excessively high, the melt viscosity of the acrylic resin (A) increases, and hence a heating temperature needed at the time of the application of the solvent-free acrylic resin composition may increase to impair the stability of the acrylic resin (A). In addition, the step followability or adhesive force of the composition tends to reduce. When the glass transition temperature is excessively low, the thermal durability of the composition tends to reduce.

Herein, the glass transition temperature of the acrylic resin (A) is determined by reading the temperature at which the loss tangent (loss modulus G"/storage modulus G'=tan δ) of the dynamic viscoelasticity of the resin becomes maximum.

The weight-average molecular weight of the acrylic resin (A) to be used in the present disclosure is preferably 50,000 or more, particularly preferably from 100,000 to 1,500,000, further preferably from 200,000 to 1,000,000, further particularly preferably from 250,000 to 800,000, most preferably from 300,000 to 600,000. When such weight-average molecular weight is excessively small, the cohesive force of the resin tends to reduce to reduce its durability. When the weight-average molecular weight is excessively large, the viscosity of the solvent-free acrylic resin composition tends to become excessively high to reduce its applicability and handleability.

In addition, the dispersity (weight-average molecular weight/number-average molecular weight) of the acrylic resin (A) is preferably 15 or less, particularly preferably 10 or less, further preferably 7 or less, further particularly preferably 5 or less. When such dispersity is excessively high, there is a tendency that the durability performance of an adhesive layer formed of the solvent-free acrylic resin composition reduces, and hence bubbles and the like are liable to occur therein. When the dispersity is excessively low, the handleability of the composition tends to reduce. The lower limit of the dispersity is typically 1.1 in terms of the production limit of the resin.

The weight-average molecular weight in the present disclosure is a weight-average molecular weight in terms of the molecular weight of a standard polystyrene, and is measured by using three columns "TSKgel GMHXL" (exclusion limit molecular weight: $4 \times 10^8$, separation range: from 100 to $4 \times 10^8$, number of theoretical plates: 14,000 plates/column, filler material: a styrene-divinylbenzene copolymer, filler particle diameter: 9 μm, column size: 7.8 mm I.D.×30 cm) and one column "TSKgel G2000HXL" (exclusion limit molecular weight: $1 \times 10^4$, separation range: from 100 to $1 \times 10^4$, number of theoretical plates: 16,000 plates/column, filler material: a styrene-divinylbenzene copolymer, filler particle diameter: 5 μm, column size: 7.8 mm I.D.×30 cm) connected in series in a high performance liquid chromatograph (manufactured by Tosoh Corporation, "HLC-8320GPC"). The number-average molecular weight may also be measured by using a similar method. In addition, the dispersity is determined from the weight-average molecular weight and the number-average molecular weight.

The acrylic resin (A) of the present disclosure is preferably a solvent-free acrylic resin that is substantially free of any solvent, and the solvent content of the acrylic resin (A) is particularly preferably 2 wt. % or less, further preferably from 0.00001 wt. % to 2 wt. %, further particularly preferably from 0.0001 wt. % to 1 wt. %, most preferably from 0.001 wt. % to 0.1 wt. %. When the solvent content is excessively large, bubbles tend to occur in an adhesive layer obtained at the time of the use of the solvent-free acrylic resin composition as an adhesive to reduce the durability of the layer.

In addition, a residual monomer amount in the acrylic resin (A) of the present disclosure is preferably 2 wt. % or less, particularly preferably from 0.00001 wt. % to 1.5 wt. %, further preferably from 0.0001 wt. % to 1.2 wt. %. When the residual monomer amount is excessively large, at the time of the heating of the solvent-free acrylic resin composition, the molecular weight of the resin tends to increase to reduce the applicability and adhesive physical property of the composition, or bubbles tend to occur in an adhesive formed of the composition to reduce the durability of the adhesive.

The solvent content and the residual monomer amount in the present disclosure are values measured as follows: a sample (e.g., the acrylic resin (A)) is diluted twentyfold with toluene, and the diluted liquid is subjected to measurement with a gas chromatograph/mass fragment detector (GC: manufactured by Agilent Technologies, 7890A GCsystem, MSD: manufactured by Agilent Technologies, 5975inert).

In addition, in the present disclosure, the content of volatile matter (typically containing the solvent and the residual monomer as main components) in the acrylic resin (A) is preferably 2 wt. % or less, particularly preferably from 0.00001 wt. % to 1.5 wt. %, further preferably from 0.0001 wt. % to 1.2 wt. %. When the volatile matter content is excessively large, at the time of the heating of the solvent-free acrylic resin composition, the molecular weight of the acrylic resin (A) tends to increase to reduce the applicability of the composition or to reduce the adhesive physical property thereof at the time of its turning into an adhesive, or bubbles tend to occur in the adhesive to reduce the durability of the adhesive.

The volatile matter content in the acrylic resin (A) is a value calculated as follows: the acrylic resin (A) is heated in a hot-air dryer at 130° C. for 1 hour, and the value is calculated from a change between its weight before the heating and that after the heating.

In the present disclosure, it is important that the resin composition include the acrylic resin (A), and the acid value in the resin composition be from 0.001 mgKOH/g to 0.3 mgKOH/g. To adjust such acid value within the range, for example, (1) a method involving producing the acrylic resin through the use of the hydroxy group-containing monomer (a1) having an extremely small residual acrylic acid amount, or (2) a method involving incorporating a compound that reacts with a carboxylic acid, such as a carbodiimide compound (B), an isocyanate compound, an epoxy compound, or an alcohol compound, into the composition is available. Of those, the method involving incorporating the compound that reacts with a carboxylic acid is preferred, and the carbodiimide compound (B) that has selective reactivity with the acid and that is rich in reactivity at from 0° C. to 100° C. is particularly preferably incorporated.

A case in which the carbodiimide compound (B) is incorporated as a constituent component for the solvent-free acrylic resin composition of the present disclosure in addition to the acrylic resin (A) is preferred in terms of the heat resistance of the composition. The carbodiimide compound (B) is described below as a typical example of the compound that reacts with a carboxylic acid.

<Carbodiimide Compound (B)>

Examples of the carbodiimide compound (B) include: monocarbodiimides, such as bis(2,6-diisopropylphenyl) carbodiimide, dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, and didodecylcarbodiimide; polycarbodiimides in each of which a plurality of carbodiimides are present; and cyclic carbodiimides. Those carbodiimide compounds may be used alone or in combination thereof. Of those, a monocarbodiimide compound (b1) is preferred in terms of the heat resistance, and bis(2, 6-diisopropylphenyl)carbodiimide is further preferred.

The content of the carbodiimide compound (B) in the present disclosure is preferably from 0.01 parts by weight to 10 parts by weight, particularly preferably from 0.1 parts by weight to 5 parts by weight, further preferably from 0.2 parts by weight to 2 parts by weight, further particularly preferably from 0.3 parts by weight to 1 part by weight with respect to 100 parts by weight of the acrylic resin (A).

When the content of the carbodiimide compound (B) is excessively small, the thermal stability of the acrylic resin (A) tends to reduce, and when the content is excessively large, the durability thereof tends to reduce.

The solvent-free acrylic resin composition of the present disclosure may include any other arbitrary component. Examples of the other arbitrary component include an antioxidant, a plasticizer, and a tackifier, and these components may be used alone or in combination thereof. The content of the other arbitrary component only needs to fall within such a range that the effects of the present disclosure are not impaired, and the content is preferably from 0.1 wt. % to 10 wt. % in the solvent-free acrylic resin composition.

The solvent-free acrylic resin composition of the present disclosure is produced by using the above-mentioned constituent components as described below.

In the solvent-free acrylic resin composition of the present disclosure, the compound that reacts with a carboxylic acid, among others, the carbodiimide compound (B) and the other arbitrary component are preferably blended before the solvent-evaporating step in the production of the acrylic resin (A) or during the evaporation (state in which the solvent remains), and the carbodiimide compound (B) is preferably blended into the acrylic resin (A) prior to the other arbitrary component in terms of the chemical stability of the resin composition to be obtained. The acrylic resin (A) and the carbodiimide compound (B) are particularly preferably mixed with each other at from 0° C. to 140° C., and are further preferably mixed with each other at from 20° C. to 100° C.

The acrylic resin composition solution obtained in the foregoing is subjected to solvent evaporation by the same method as that of the acrylic resin (A) described in the foregoing to provide the solvent-free acrylic resin composition.

In the present disclosure, the solvent content in the solvent-free acrylic resin composition is preferably 2 wt. % or less, particularly preferably 1 wt. % or less.

The solvent-free acrylic resin composition of the present disclosure preferably includes 80 wt. % or more of the acrylic resin (A) with respect to the entirety of the resin composition in terms of its reliability at the time of endurance, and the content is particularly preferably from 90 wt. % to 99.9 wt. %, further preferably from 95 wt. % to 99.9 wt. %.

The acid value of the solvent-free acrylic resin composition is from 0.001 mgKOH/g to 0.3 mgKOH/g, preferably from 0.001 mgKOH/g to 0.15 mgKOH/g, particularly preferably from 0.001 mgKOH/g to 0.1 mgKOH/g.

The melt viscosity change ratio M of the solvent-free acrylic resin composition of the present disclosure represented by the following equation 1, that is, the melt viscosity change ratio M (3) at 130° C. when the melt viscosity of the solvent-free acrylic resin composition at 130° C. after its heating treatment at 130° C. for 3 hours is represented by "M2", and the melt viscosity of the solvent-free acrylic resin composition at 130° C. before such heating treatment is represented by "M1" is preferably 10 or less, particularly preferably 7 or less, further preferably 4 or less. When such change ratio M is more than 10, at the time of the use of the composition as an adhesive, its applicability tends to reduce, or a desired adhesive physical property tends to be hardly obtained.

$$M(\%)=(|M2-M1|/M1)\times 100 \qquad \text{[Equation 1]}$$

M2: The melt viscosity (Pa·s) of the solvent-free acrylic resin composition at 130° C. after its heating treatment at 130° C. for 3 hours M1: The melt viscosity (Pa·s) of the solvent-free acrylic resin composition at 130° C. before the heating treatment The melt viscosities are values measured with a rotational rheometer manufactured by Anton Paar GmbH under a nitrogen atmosphere and under the following conditions.

Measuring equipment: MCR 301
Cone plate diameter: 25 mm
Measurement distance: 0.5 mm
Measurement shear rate: 0.002 (1/s)

The weight-average molecular weight of the solvent-free acrylic resin composition is preferably 50,000 or more, particularly preferably from 100,000 to 1,500,000, further preferably from 200,000 to 1,000,000, further particularly preferably from 250,000 to 800,000, most preferably from 300,000 to 600,000. When such weight-average molecular weight is excessively small, the cohesive force of the composition tends to reduce to reduce its durability. When the weight-average molecular weight is excessively large, the viscosity of the composition tends to become excessively high to reduce its applicability and handleability.

In addition, the dispersity (weight-average molecular weight/number-average molecular weight) of the solvent-free acrylic resin composition is preferably 15 or less, particularly preferably 10 or less, further preferably 7 or less, further particularly preferably 5 or less. When such dispersity is excessively high, there is a tendency that the durability performance of an adhesive layer formed of the composition reduces, and hence bubbles and the like are liable to occur therein. When the dispersity is excessively low, the handleability of the composition tends to reduce. The lower limit of the dispersity is typically 1.1 in terms of the production limit of the composition.

It is useful to use the solvent-free acrylic resin composition of the present disclosure as a material component for an adhesive, and it is particularly useful to use the composition as a material component for a hot melt-type adhesive.

<Adhesive Sheet>

The solvent-free acrylic resin composition of the present disclosure is preferably used as an adhesive sheet obtained by arranging an adhesive layer, which is obtained by using the composition, on a base material sheet, as a double-sided adhesive sheet obtained by arranging such adhesive layer on a release sheet, or as an optical member with an adhesive layer obtained by arranging such adhesive layer on an optical member.

The adhesive layer may be the very solvent-free acrylic resin composition of the present disclosure, or may be a solvent-free acrylic adhesive composition obtained by blending the solvent-free acrylic resin composition of the present disclosure with at least one selected from the group consisting of an active energy ray-curable monomer and a crosslinking agent. When such solvent-free acrylic adhesive composition is used, the adhesive layer is typically cured (crosslinked) to become a solvent-free acrylic adhesive.

At the time of the curing, for example, a method involving curing a solvent-free acrylic adhesive composition, which is obtained by incorporating the active energy ray-curable monomer into the solvent-free acrylic resin composition, with an active energy ray, a method involving crosslinking a solvent-free acrylic adhesive composition, which is obtained by incorporating the crosslinking agent into the solvent-free acrylic resin composition, to cure the layer, or a method obtained by combining these methods is available.

The adhesive sheet may be produced, for example, as described below.

In the present disclosure, the term "sheet" is not particularly distinguished from the terms "film" and "tape", and is described as meaning comprehending the film and the tape as well.

First, the adhesive layer is formed on one surface, or each of both surfaces, on the base material sheet so as to have a predetermined thickness by, for example, a method involving heating the solvent-free acrylic resin composition to bring the composition into a molten state, applying the molten composition to one surface, or each of both surfaces, of the base material sheet, and then cooling the applied composition, or a method involving heating the solvent-free acrylic resin composition to melt the composition, and extruding the molten composition from a T-die or the like to laminate the composition on the base material sheet. Next, the release sheet is bonded to the surface of the adhesive layer as required. Thus, the adhesive sheet can be produced.

In addition, in the case of the solvent-free acrylic adhesive composition, as in the solvent-free acrylic resin composition, an adhesive sheet including an adhesive layer obtained by curing (crosslinking) the solvent-free acrylic adhesive composition may be produced by: forming the adhesive layer formed of the composition before its curing on the base material sheet; and then subjecting the layer to at least one selected from the group consisting of active energy ray irradiation and an aging treatment (of those, the active energy ray irradiation alone, or the aging treatment after the active energy ray irradiation is preferred, and the aging treatment after the active energy ray irradiation is particularly preferred).

In addition, a base material-less double-sided adhesive sheet may be produced by forming the adhesive layer on the release sheet and bonding another release sheet to the surface of the adhesive layer opposite to the release sheet.

At the time of the use of the resultant adhesive sheet or double-sided adhesive sheet, the release sheet is peeled from the adhesive layer before the use.

An example of the base material sheet is a sheet formed of at least one synthetic resin selected from the group consisting of: polyester resins, such as polyethylene naphthalate, polyethylene terephthalate, polybutylene terephthalate, and a polyethylene terephthalate/isophthalate copolymer; polyolefin resins, such as polyethylene, polypropylene, and polymethylpentene; polyethylene fluoride resins, such as polyvinyl fluoride, polyvinylidene fluoride, and polyethylene fluoride; polyamides, such as nylon 6 and nylon 6,6; vinyl polymers, such as polyvinyl chloride, a polyvinyl chloride/vinyl acetate copolymer, an ethylene-vinyl acetate copolymer, an ethylene-vinyl alcohol copolymer, polyvinyl alcohol, and vinylon; cellulose resins, such as cellulose triacetate and cellophane; acrylic resins, such as polymethyl methacrylate, polyethylmethacrylate, polyethylacrylate, and polybutyl acrylate; polystyrene; polycarbonate; polyarylate; and polyimide. Examples thereof also include: metal foils, such as aluminum, copper, and iron; paper, such as high-quality paper and glassine paper; and a woven fabric and a nonwoven fabric each formed of, for example, a glass fiber, a natural fiber, or a synthetic fiber.

Those base material sheets may be used as a single-layer body or as a multilayer body obtained by laminating two or more kinds thereof. Of those, a sheet formed of a synthetic resin is preferred in terms of, for example, a weight reduction.

Further, for example, a product obtained by subjecting any one of the sheets formed of various synthetic resins, the paper, the woven fabric, and the nonwoven fabric given as examples of the base material sheet to a release treatment may be used as the release sheet. A silicon release sheet is preferably used as the release sheet.

In addition, a method of applying the solvent-free acrylic resin composition or the solvent-free acrylic adhesive composition is not particularly limited as long as the method is a general application method, and examples of the method include methods such as roll coating, die coating, gravure coating, comma coating, and screen printing.

At the time of the performance of the active energy ray irradiation, the solvent-free acrylic adhesive composition obtained by blending the solvent-free acrylic resin composition with the active energy ray-curable monomer is preferably used. The performance of the active energy ray irradiation causes the acrylic resin (A) in the solvent-free acrylic adhesive composition to form at least one selected from the group consisting of an intramolecular crosslinked structure and an intermolecular crosslinked structure. Accordingly, the cohesive force of the entirety of the adhesive layer is adjusted, and hence a stable adhesive physical property can be obtained.

The active energy ray-curable monomer is preferably a polyfunctional monomer containing two or more ethylenically unsaturated groups in one molecule. Examples thereof include hexanediol di(meth)acrylate, butanediol di(meth)acrylate, (poly)ethylene glycol di(meth)acrylate, (poly)propylene glycol di(meth)acrylate, neopentyl glycol di(meth) acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, isocyanuric acid ethylene oxide-modified tri(meth)acrylate, allyl (meth)acrylate, vinyl (meth)acrylate, and urethane (meth)acrylate. Of those, pentaerythritol tri(meth)acrylate is preferred. The polyfunctional monomers may be used alone or in combination thereof.

Such polyfunctional monomer is used in an amount of preferably from 0.001 parts by weight to 20 parts by weight, particularly preferably from 0.01 parts by weight to 10 parts by weight, further preferably from 0.1 parts by weight to 5 parts by weight with respect to 100 parts by weight of the acrylic resin (A).

At the time of the performance of the active energy ray irradiation, for example, light beams, such as far-UV light, UV light, near-UV light, and an infrared ray, electromagnetic waves, such as an X-ray and a γ-ray, and an electron beam, a proton beam, and a neutron beam may each be utilized. However, curing by UV irradiation is advantageous in terms of, for example, a curing rate, and the ease of availability and price of an irradiation apparatus.

In addition, a high-pressure mercury lamp, an electrodeless lamp, an ultrahigh-pressure mercury lamp, a carbon arc lamp, a xenon lamp, a metal halide lamp, a chemical lamp, a black light, an LED lamp, or the like is used as a light source at the time of the performance of the UV irradiation. In the case of the high-pressure mercury lamp, the irradiation is performed under the condition of an irradiance of, for example, from 5 mJ/cm$^2$ to 3,000 mJ/cm$^2$, preferably from 50 mJ/cm$^2$ to 2,000 mJ/cm$^2$.

When the curing is performed by the active energy ray irradiation, a photopolymerization initiator is preferably used because the initiator can stabilize the reaction of the acrylic resin at the time of the active energy ray irradiation.

Such photopolymerization initiator is not particularly limited as long as the photopolymerization initiator generates a radical with an action of light, and examples thereof include photopolymerization initiators, such as an acetophenone, a benzoin, a benzophenone, a thioxanthone, and an acylphosphine oxide. Those photopolymerization initiators may be used alone or in combination thereof. A hydrogen abstraction-type benzophenone-type photopolymerization initiator is preferably used because the initiator enables efficient intermolecular or intramolecular crosslinking of the resin.

Such photopolymerization initiator is blended in an amount of preferably from 0.01 parts by weight to 10 parts by weight, particularly preferably from 0.1 parts by weight to 5 parts by weight, further preferably from 0.5 parts by weight to 2 parts by weight with respect to 100 parts by weight of the acrylic resin (A). When such blending amount is excessively small, the curing rate of the solvent-free acrylic adhesive composition tends to reduce, or the curing thereof tends to be insufficient. Even when the blending amount is excessively large, the curability thereof is not improved, but instead an economic efficiency tends to reduce.

In addition, as an auxiliary agent for those photopolymerization initiators, for example, triethanolamine, triisopropanolamine, 4,4'-dimethylaminobenzophenone (Michler's ketone), 4,4'-diethylaminobenzophenone, 2-dimethylaminoethyl benzoate, ethyl 4-dimethylaminobenzoate, (n-butoxy) ethyl 4-dimethylaminobenzoate, isoamyl 4-dimethylaminobenzoate, 2-ethylhexyl 4-dimethylaminobenzoate, 2,4-diethylthioxanthone, or 2,4-diisopropylthioxanthone may be used in combination therewith. Those auxiliary agents may also be used alone or in combination thereof.

At the time of the performance of the aging treatment, the solvent-free acrylic adhesive composition obtained by blending the solvent-free acrylic resin composition with the crosslinking agent is preferably used. The aging treatment is performed under the conditions of a temperature of typically from room temperature (25° C.) to 100° C. and a time period of typically from 1 day to 30 days. Specifically, the treatment only needs to be performed under, for example, the following conditions: at 23° C. for from 1 day to 20 days (preferably at 23° C. for from 3 days to 10 days) or at 40° C. for from 1 day to 7 days.

In addition, in the adhesive sheet of the present disclosure, the adhesive layer may be blended with any other adhesive or with a conventionally known additive, such as a crosslinking accelerator, a silane coupling agent, an antistatic agent, a tackifier, a functional dye, or an antioxidant, as required to the extent that the effects of the present disclosure are not impaired.

In addition, in the present disclosure, the optical member with an adhesive layer may be obtained by laminating and forming the above-mentioned adhesive layer on the optical member. In addition, the optical members may be bonded to each other with the above-mentioned double-sided adhesive sheet.

The gel fraction of the adhesive layer of the adhesive sheet is preferably from 10 wt. % to 100 wt. %, particularly preferably from 30 wt. % to 90 wt. %, further particularly preferably from 50 wt. % to 80 wt. % in terms of its durability performance and adhesive force. When the gel fraction is excessively low, the cohesive force of the layer tends to reduce to reduce its durability. When the gel fraction is excessively high, the cohesive force tends to rise to reduce the adhesive force.

The adjustment of the gel fraction within the range is achieved by, for example, adjusting the active energy ray irradiance or the amount of the photopolymerization initiator, adjusting the kind or amount of the active energy ray-curable monomer, or when the crosslinking agent is used, adjusting the kind or amount of the crosslinking agent.

The gel fraction serves as a measure of the crosslinking degree (curing degree) of the adhesive layer, and is calculated by, for example, the following method. That is, an adhesive sheet (on which no separator has been arranged) obtained by forming an adhesive layer on a polymer sheet (e.g., a polyethyleneterephthalate (PET) sheet) serving as a base material is wrapped with a 200-mesh metal gauze made of SUS, and is immersed in toluene at 23° C. for 24 hours. The weight percentage of an undissolved adhesive component remaining in the metal gauze with respect to the weight of the adhesive component before the toluene immersion is adopted as a gel fraction; provided that the weight of the base material is subtracted.

In normal cases, the thickness of the adhesive layer of the adhesive sheet is preferably from 50 μm to 3,000 μm, particularly preferably from 75 μm to 1,000 μm, further preferably from 80 μm to 350 μm. When the thickness of the adhesive layer is excessively small, its impact absorbability tends to reduce, and when the thickness is excessively large, the thickness of the entirety of the optical member tends to increase to reduce its practicality.

The thickness of the adhesive layer is a value determined by subtracting the value of the thickness of a constituent member except the adhesive layer measured with "ID-C112B" manufactured by Mitutoyo Corporation from the value of the thickness of the entirety of a laminate including the adhesive layer measured therewith.

Although the adhesive force of the adhesive layer of each of the adhesive sheet, the double-sided adhesive sheet, and the optical member with an adhesive layer described above is appropriately determined in accordance with, for example, a material for an adherend, in, for example, the case where any such sheet or member is bonded to a glass substrate, a polycarbonate plate, a polymethyl methacrylate plate, or a PET sheet onto which an ITO layer has been deposited from the vapor, the layer has an adhesive force of preferably from 5 N/25 mm to 100 N/25 mm, particularly preferably from 10 N/25 mm to 50 N/25 mm.

The adhesive force is measured, for example, as described below. A polyethylene terephthalate (PET) sheet with an adhesive layer is produced by: peeling, from the adhesive layer of a base material-less double-sided adhesive sheet obtained by using polyester release sheets (polyethylene terephtalate sheets), a release sheet on one surface; and pressing the remainder against an easy adhesion-treated PET sheet having a thickness of 125 μm. The PET sheet with an adhesive layer is cut into a piece measuring 25 mm wide by 100 mm long. The other release sheet is peeled from the piece, and the adhesive layer side of the remainder is brought into close contact with the above-mentioned adherend, and is bonded thereto under pressure by reciprocating a 2-kilogram rubber roller twice under an atmosphere at 23° C. and 50% RH. The resultant is left at rest under the atmosphere for 30 minutes, and then the 180-degree peel strength (N/25 mm) of the adhesive layer is measured at normal temperature (23° C.) and a peel rate of 300 mm/min.

The haze value of the adhesive layer is preferably 2% or less, particularly preferably 1% or less, further preferably 0.5% or less. When such haze value is excessively high, the adhesive layer tends to whiten to be reduced in transparency.

Herein, the haze value is measured in conformity with JIS K 7361-1, and is a value measured with a haze meter.

The color difference value b* of the adhesive layer is preferably 1 or less, particularly preferably 0.5 or less. When such color difference value b* is excessively high, the layer tends to be poor in transparency. The lower limit of the color difference value b* is typically −1.

Herein, the color difference value b* is measured in conformity with JIS K 7105, and is a value measured with a spectral color difference meter under a transmission condition.

The YI value of the adhesive layer is preferably 2.0 or less, particularly preferably 1.0 or less, further preferably 0.5 or less. When such YI value is excessively high, the adhesive layer tends to be poor in transparency.

Herein, the YI value is measured in conformity with JIS K 7373, and is a value measured with a spectral color difference meter under a transmission condition.

The haze value, the color difference value b*, and the YI value in the present disclosure are values measured by bonding only the adhesive layer to alkali-free glass (total light transmittance=93%, haze value=0.06%, value b*=0.16).

The solvent-free acrylic resin composition of the present disclosure is excellent in thermal stability, can be thickly applied, and is excellent in moist-heat resistance. Accordingly, an adhesive obtained by using the solvent-free acrylic resin composition may be suitably used in a double-sided adhesion application, or as an adhesive having impact resistance and a strong adhesive property. Specifically, the adhesive is useful as an adhesive component for applications where optical members, such as optical sheets including glass, an ITO transparent electrode sheet, a polyethylene terephthalate (PET), a polycarbonate (PC), and a polymethyl methacrylate (PMMA), a polarizing plate, a retardation plate, an optical compensation film, and a brightness enhancement film, are bonded. Further, the adhesive may be suitably used in an image display apparatus, such as a touch panel, which includes any such optical member.

In addition, the solvent-free acrylic resin composition of the present disclosure and the solvent-free acrylic adhesive obtained by using the composition may be used as various adhesives for labels and an adhesive for masking, and are suitably used particularly in, for example, electronic part applications.

EXAMPLES

Now, the present disclosure is further specifically described by way of Examples. The present disclosure is not limited to Examples below without departing from the gist of the present disclosure.

In the examples, the term "part (s)" means "part (s) by weight". In addition, the weight-average molecular weight and dispersity of an acrylic resin composition were measured in conformity with the methods of measuring the weight-average molecular weight and dispersity of the acrylic resin (A) described in the foregoing.

The acid value, glass transition temperature, and volatile matter content of the acrylic resin (A), and the acid value of the acrylic resin composition were measured as described below.

The content of a structural moiety after the completion (polymerization) of the acrylic resin (A) is substantially the same as the blending content of the polymerization component.

<Glass Transition Temperature (Tg) of Acrylic Resin (A)>

The solution of the acrylic resin (A) before the evaporation of its solvent was applied to a polyester release sheet, and was dried to be laminated thereon. Thus, an adhesive sheet that was in an uncrosslinked state and had a thickness of about 650 μm was produced. The dynamic viscoelasticity of the produced adhesive sheet was measured under the following conditions, and the temperature at which its loss tangent (loss modulus G"/storage modulus G'=tan δ) became maximum was read and adopted as the glass transition temperature (Tg) of the acrylic resin (A).

Measuring equipment: DVA-225 (manufactured by IT Keisoku Seigyo K.K.)

Deformation mode: Shearing

Strain: 0.1%

Measurement temperature: From −100° C. to 20° C.

Measurement frequency: 1 Hz

<Acid Value of Acrylic Resin (A)>

Y Grams of the acrylic resin (A) was collected in a beaker, and was dissolved in a mixed solvent containing toluene and methanol at 7:3. After that, a proper amount of phenolphthalein was added to the solution, and the mixture was titrated with a 0.1 mol/L KOH solution while being stirred with a stirrer. The amount X (mL) of the KOH solution at the time point when the color of the mixture became pale pink was read as an end point, and the acid value of the resin was calculated from the following equation 2.

$$\text{Acid value}(\text{mgKOH/g}) = X \times (f \times M \times 56.1)/Y \quad \text{[Equation 2]}$$

f: The factor of the KOH solution

M: The molar concentration (mol/L) of the KOH solution

X: The amount (mL) of the KOH solution

Y: The amount (g) of the sample

When the acid value was low, a 0.01 mol/L KOH solution was used to improve its accuracy.

<Volatile Matter Content of Acrylic Resin (A)>

0.5 Grams of the acrylic resin (A) was weighed in an aluminum cup, and was heated with a hot-air dryer (at 130° C. for 1 hour), followed by the calculation of its volatile matter content from a change between its weight before the heating and that after the heating through the use of the following equation 3.

$$\text{Volatile matter content (\%)} = 100 - \{(\text{weight after heating/weight before heating}) \times 100\} \quad \text{[Equation 3]}$$

<Acid Value of Acrylic Resin Composition>

The measurement of the acid value of the acrylic resin composition was performed in conformity with the above-mentioned method of measuring the acid value of the acrylic resin (A).

Example 1

<Production of Solvent-Free Acrylic Resin Composition (I-1)>

100 Parts of ethyl acetate (boiling point: 77° C.) serving as a polymerization solvent and 0.02 parts of 2,2'-azobis(2,4-dimethylvaleronitrile) (ADVN, half-life temperature: 52° C.) serving as a polymerization initiator were loaded into a 2-liter flask with a condenser, and were heated to reflux in the flask. A solution obtained by mixing 150 parts of 2-ethylhexyl acrylate (2EHA), 50 parts of methyl acrylate (MA), 50 parts of 2-hydroxyethyl acrylate (HEA), 25 parts of acetone, and 0.6 parts of ADVN in advance was dropped to the resultant over 3 hours. 30 Minutes after the dropping, 0.3 parts of ADVN was dropped to the mixture over 1 hour, and the whole was subjected to a reaction. Thus, a solution of the acrylic resin (A) was obtained. Subsequently, 1.5 parts of bis(2,6-diisopropylphenyl)carbodiimide (DIPC) was added to the solution, and the mixture was subjected to a reaction for 4 hours. After that, 0.6 parts of "Irganox 1010" (manufactured by BASF) was added as an antioxidant to the resultant. Thus, an acrylic resin composition solution was obtained.

The acrylic resin composition solution obtained in the foregoing was loaded into a flask including a reflux-extracting tube so that its solvent could be evaporated to the outside of the system. The solvent was evaporated by: holding the solution at 90° C. for 1 hour; and holding the solution at 90° C. for 2 hours while reducing a pressure in the flask to 10 kPa. Thus, a solvent-free acrylic resin composition (I-1) was obtained.

The various physical properties of the acrylic resin (A) and the solvent-free acrylic resin composition (I-1) thus obtained are shown in Table 1 below.

The term "part(s)" shown in Table 1 represents the number of parts by weight when the total of the polymerization components of the acrylic resin (A) is set to 100 parts.

[Thermal Stability]

The solvent-free acrylic resin composition (I-1) obtained in the foregoing was evaluated for its thermal stability as described below.

First, the solvent-free acrylic resin composition was placed on the lower plate of a rotational rheometer (rotational rheometer manufactured by Anton Paar GmbH), and air surrounding the composition was purged with nitrogen, followed by the measurement of its melt viscosity at 130° C. After the measurement, the composition was heated at the same temperature for 3 hours, and then its melt viscosity was measured again. The ratio M at which the melt viscosity was changed by the heating treatment was determined from the following equation 1, and the thermal stability was evaluated in accordance with the following evaluation criteria.

$$M(\%) = (|M2 - M1|/M1) \times 100 \quad \text{[Equation 1]}$$

M2: The melt viscosity (Pa·s) of the solvent-free acrylic resin composition at 130° C. after its heating treatment at 130° C. for 3 hours M1: The melt viscosity (Pas) of the solvent-free acrylic resin composition at 130° C. before the heating treatment (Evaluation Criteria)

○ . . . The M is 10 or less.

x . . . The M is more than 10.

<Production of Solvent-Free Acrylic Adhesive Composition>

5 Parts of trimethylolpropanetriacrylate (TMPTA) and 0.5 parts of "OMNIRAD 500" (manufactured by IGM Resins B.V.) serving as a photopolymerization initiator were added to 100 parts of the solvent-free acrylic resin composition (I-1) obtained in the foregoing, and the materials were warmed and sufficiently mixed to provide a solvent-free acrylic adhesive composition.

The resultant solvent-free acrylic adhesive composition was subjected to the following evaluations. The results are shown in Table 2 and Table 3 below.

The solvent-free acrylic adhesive composition obtained in the foregoing was sandwiched between polyester release sheets (each having a thickness of 176 μm), and the resultant was pressed while being heated at 100° C. so that the thickness of its adhesive layer became 160 μm. Further, the pressed product was irradiated with UV light through the use of a high-pressure mercury UV irradiation apparatus at a peak illuminance of 150 mW/cm$^2$ and an integrated exposure of 1,000 mJ/cm$^2$ (twice at 500 mJ/cm$^2$). Thus, a base material-less double-sided adhesive sheet was obtained. At this time, the solvent-free acrylic adhesive composition serves as an adhesive.

In addition, the release sheet on one surface was peeled from the adhesive layer of the base material-less double-sided adhesive sheet obtained in the foregoing, and the remainder was pressed against an easy adhesion-treated polyethylene terephthalate (PET) sheet (thickness: 125 μm). Thus, a PET sheet with an adhesive layer in which the thickness of the adhesive layer was 160 μm was obtained.

[Gel Fraction]

The base material-less double-sided adhesive sheet was cut into a size measuring 40 mm by 40 mm. After that, the sheet was irradiated with UV light through the use of a high-pressure mercury UV irradiation apparatus at a peak illuminance of 150 mW/cm$^2$ and an integrated exposure of 2,000 mJ/cm$^2$ (twice at 1,000 mJ/cm$^2$), and was left at rest under the conditions of 23° C. and 50% RH for 30 minutes. After that, one release sheet was peeled from the resultant, and the adhesive layer side of the remainder was bonded to a SUS mesh sheet (200 meshes) measuring 50 mm by 100 mm. After that, the other release sheet was peeled from the resultant, and the remainder was folded back from its central portion with respect to the lengthwise direction of the SUS mesh sheet so that the adhesive layer serving as a sample was wrapped. After that, the wrapped sample was immersed in a sealed container containing 250 g of toluene at 23° C.

for 24 hours. The gel fraction (wt. %) of the sample was measured from its weight change at the time of the immersion.

[Adhesive Force]

The PET sheet with an adhesive layer was cut into a size measuring 25 mm wide by 100 mm long, and was irradiated with UV light through the use of a high-pressure mercury UV irradiation apparatus at a peak illuminance of 150 mW/cm$^2$ and an integrated exposure of 2,000 mJ/cm$^2$ (twice at 1,000 mJ/cm$^2$). After that, the release sheet was peeled from the resultant, and the adhesive layer side of the remainder was bonded to alkali-free glass ("EAGLE XG" manufactured by Corning Incorporated, thickness: 1.1 mm) under pressure by reciprocating a 2-kilogram rubber roller twice under an atmosphere at 23° C. and 50% RH. The resultant was left at rest under the conditions of 23° C. and 50% RH for 30 minutes, and then the 180-degree peel strength (N/25 mm) of the adhesive layer was measured at normal temperature and a peel rate of 300 mm/min.

[Optical Properties]

The base material-less double-sided adhesive sheet was cut into a size measuring 25 mm by 25 mm, and was irradiated with UV light through the use of a high-pressure mercury UV irradiation apparatus at a peak illuminance of 150 mW/cm$^2$ and an integrated exposure of 2,000 mJ/cm$^2$ (twice at 1,000 mJ/cm$^2$). After that, the release sheet on one surface was peeled from the adhesive layer of the resultant, and the adhesive layer side of the remainder was bonded to alkali-free glass ("EAGLE XG" manufactured by Corning Incorporated, thickness: 1.1 mm). After that, the resultant was subjected to an autoclave treatment (at 50° C. and 0.5 MPa for 20 minutes), and was left at rest under the conditions of 23° C. and 50% RH for 30 minutes. Finally, the other release sheet was peeled from the resultant. Thus, a test piece having a configuration of "alkali-free glass/adhesive layer" was produced.

The haze value, total light transmittance, color difference value b*, and YI value of the resultant test piece were measured.

[Haze Value]

The haze value was calculated by: measuring the diffuse transmittance and total light transmittance of the test piece with HAZE METER NDH2000 (manufactured by Nippon Denshoku Industries Co., Ltd.); and substituting the values of the diffuse transmittance (T1) and the total light transmittance (T2) thus obtained into the following equation 4. The machine is in conformity with JIS K 7361-1.

Haze value (%)=(T1/T2)×100  [Equation 4]

T1: The diffuse transmittance
T2: The total light transmittance

[Color Difference]

The color difference value b* was measured in conformity with JIS K 7105, and the measurement was performed with a spectral color difference meter (SE 6000: manufactured by Nippon Denshoku Industries Co., Ltd.) under a transmission condition.

[YI Value]

The YI value was measured in conformity with JIS K 7373, and the measurement was performed with a spectral color difference meter (SE 6000: manufactured by Nippon Denshoku Industries Co., Ltd.) under a transmission condition.

The haze value, the total light transmittance, the color difference value b*, and the YI value in the present disclosure are values measured by bonding only the adhesive layer to alkali-free glass (total light transmittance=93%, haze value=0.06%, value b*=0.16).

[Sheet Heat Resistance]

The above-mentioned base material-less double-sided adhesive sheet was cut into a size measuring 30 mm by 50 mm, and was irradiated with UV light through the use of a high-pressure mercury UV irradiation apparatus at a peak illuminance of 150 mW/cm$^2$ and an integrated exposure of 2,000 mJ/cm$^2$ (twice at 1,000 mJ/cm$^2$). After that, the release sheet on one surface was peeled from the adhesive layer of the resultant, and the adhesive layer side of the remainder was bonded to alkali-free glass ("EAGLE XG" manufactured by Corning Incorporated, thickness: 1.1 mm). After that, the other release sheet was peeled from the resultant, and the other side of the remainder was also bonded to alkali-free glass (manufactured by Corning Incorporated, "EAGLE XG"), followed by an autoclave treatment (at 50° C. and 0.5 MPa for 20 minutes). Thus, a test piece having a configuration of "alkali-free glass/adhesive layer/alkali-free glass" was produced.

A thermal stability test was performed by using the resultant test piece under an atmosphere at 150° C. for 7 days (168 hours) to measure its value b* after the thermal stability test, followed by an evaluation by the following criteria. The value b* was measured by the same method as that in the measurement of the optical properties of the adhesive layer described above.

(Evaluation Criteria)

○ . . . A difference between the values b* before and after the thermal stability test is less than 1.0.

Δ . . . A difference between the values b* before and after the thermal stability test is 1.0 or more and less than 2.0.

x . . . A difference between the values b* before and after the thermal stability test is 2.0 or more.

[Moist-Heat Haze Resistance]

The above-mentioned PET sheet with an adhesive layer was cut into a size measuring 30 mm by 50 mm, and was irradiated with UV light through the use of a high-pressure mercury UV irradiation apparatus at a peak illuminance of 150 mW/cm$^2$ and an integrated exposure of 2,000 mJ/cm$^2$ (twice at 1,000 mJ/cm$^2$). After that, the release sheet was peeled from the resultant, and the adhesive layer side of the remainder was bonded to alkali-free glass ("EAGLE XG" manufactured by Corning Incorporated, thickness: 1.1 mm). After that, the resultant was subjected to an autoclave treatment (at 50° C. and 0.5 MPa for 20 minutes), and was left at rest under the conditions of 23° C. and 50% RH for 30 minutes. Thus, a test piece having a configuration of "alkali-free glass/adhesive layer/PET sheet" was produced.

A moist-heat resistance test was performed by using the resultant test piece under an atmosphere at 60° C. and 90% RH for 7 days (168 hours) to measure its haze values before the start of the moist-heat resistance test and immediately after the moist-heat resistance test, followed by an evaluation by the following criteria. The haze values were measured by the same method as that in the measurement of the optical properties of the adhesive layer described above.
(Evaluation Criteria)
○ . . . The haze value immediately after the moist-heat resistance test is less than 2.0%, and the ratio at which the haze value rises after the moist-heat resistance test as compared to that before the test is less than 100%.
Δ . . . The haze value immediately after the moist-heat resistance test is less than 2.0%, and the ratio at which the haze value rises after the moist-heat resistance test as compared to that before the test is 100% or more.
x . . . The haze value immediately after the moist-heat resistance test is 2.0% or more.
The ratio (%) at which the haze value rises after the moist-heat resistance test as compared to that before the test is determined from the following equation 5.

Rise ratio (%)=(H2−H1)/H1×100      [Equation 5]

H1: The haze value before the test
H2: The haze value after the test
[Corrosion Resistance]
The above-mentioned PET sheet with an adhesive layer was cut into a size measuring 40 mm by 50 mm, and was irradiated with UV light through the use of a high-pressure mercury UV irradiation apparatus at a peak illuminance of 150 mW/cm² and an integrated exposure of 2,000 mJ/cm² (twice at 1,000 mJ/cm²). After that, the release sheet was peeled from the resultant, and the adhesive layer side of the remainder was bonded to a copper plate (manufactured by Kyuho Corporation, thickness: 0.3 mm). After that, the resultant was subjected to an autoclave treatment (at 50° C. and 0.5 MPa for 20 minutes), and was left at rest under the conditions of 23° C. and 50% RH for 30 minutes. Thus, a test piece having a configuration of (copper plate/adhesive layer/PET sheet) was produced.
A moist-heat resistance test was performed by using the resultant test piece under an atmosphere at 85° C. and 85% RH for 28 days (672 hours). The appearance of the test piece after the moist-heat resistance test was visually observed, and was evaluated by the following criteria.

(Evaluation Criteria)
○○ . . . The discoloration of the copper plate is very slight or is not observed.
○ . . . The copper plate is slightly discolored to a darker color.
Δ . . . The copper plate is entirely discolored to a darker color.
x . . . The copper plate is entirely discolored to black.

Examples 2 to 4, and Comparative Examples 1 and 2

[Production of Solvent-Free Acrylic Resin Compositions (I-2) to (I-4), and (I'-1) and (I'-2)]
Solvent-free acrylic resin compositions were each obtained by performing production in conformity with the same method as that in the production of the solvent-free acrylic resin composition (I-1) except that polymerization component composition shown in Table 1 was adopted. The various physical properties of the resultant solvent-free acrylic resin compositions were measured and evaluated in the same manner as in Example 1. The results are collectively shown in Table 1 below.

TABLE 1

|  | Solvent-free acrylic resin composition | Polymerization composition (part(s)) of acrylic resin (A) | | | | Blended component (parts) | | Acrylic resin (A) | | | Acrylic resin composition | | |
|---|---|---|---|---|---|---|---|---|---|---|---|---|---|
|  |  | HEA (a1) | 2EHA (a2) | MA (a3) | tBA (a3) | DIPC (B) | Irganox 1010 | Acid value (mgKOH/g) | Glass transition temperature (° C.) | Volatile matter content (%) | Acid value (mgKOH/g) | Weight-average molecular weight | Dispersity |
| Example 1 | I-1 | 20 | 60 | 20 | — | 0.60 | 0.25 | 0.38 | −15 | 1.4 | 0.08 | 382,000 | 3.83 |
| Example 2 | I-2 | 20 | 60 | 20 | — | 2.40 | 0.25 | 0.38 | −15 | 1.1 | 0.06 | 371,000 | 3.67 |
| Example 3 | I-3 | 15 | 65 | 20 | — | 0.45 | 0.25 | 0.36 | −18 | 0.9 | 0.08 | 494,000 | 4.09 |
| Example 4 | I-4 | 15 | 65 | — | 20 | 0.45 | 0.25 | 0.30 | −18 | 0.8 | 0.11 | 440,000 | 4.49 |
| Comparative Example 1 | I'-1 | 20 | 60 | 20 | — | — | 0.50 | 0.38 | −15 | 1.6 | 0.38 | 396,000 | 4.17 |
| Comparative Example 2 | I'-2 | 20 | 80 | — | — | — | 0.50 | 0.41 | −27 | 1.6 | 0.41 | 556,000 | 4.77 |

HEA: 2-hydroxyethyl acrylate,
2EHA: 2-ethylhexyl acrylate,
MA: methyl acrylate,
tBA: t-butyl acrylate,
DIPC: bis(2,6-diisopropylphenyl)carbodiimide,
Irganox 1010: pentaerythritol tetrakis [3-(3',5'-di-tert-butyl-4'-hydroxyphenyl)propionate]

[Production of Solvent-Free Acrylic Adhesive Compositions]
Solvent-free acrylic adhesive compositions were each obtained in the same manner as in Example 1 except that the kind of the solvent-free acrylic resin composition was changed as shown in Table 1. Further, base material-less double-sided adhesive sheets in each of which the thickness of an adhesive layer was 160 μm, and PET sheets with adhesive layers in each of which the thickness of an adhesive layer was 160 μm were obtained.
The resultant solvent-free acrylic adhesive compositions were subjected to the same evaluations as those of Example 1. The evaluation results of Examples and Comparative Examples are shown in Table 2 and Table 3 below.

TABLE 2

| | Thermal stability Melt viscosity change at 130° C. | | | | | | Optical property | | |
|---|---|---|---|---|---|---|---|---|---|
| | Melt viscosity before heating treatment (Pa · s) | Melt viscosity after heating treatment for 3 hours (Pa · s) | Increase ratio M (%) | Evaluation | Gel fraction (wt. %) | Adhesive force (N/25 mm) | Haze value (%) | Total light transmittance (%) | Color difference b* | YI |
| Example 1 | 261 | 271 | 3.6 | ○ | 60.9 | 44.5 | 0.3 | 92.9 | 0.2 | 0.6 |
| Example 2 | 208 | 215 | 3.3 | ○ | 57.1 | 48.0 | 0.3 | 92.9 | 0.1 | 0.4 |
| Example 3 | 366 | 382 | 4.4 | ○ | 67.5 | 35.0 | 0.3 | 93.0 | 0.2 | 0.5 |
| Example 4 | 446 | 475 | 6.7 | ○ | 62.2 | 38.9 | 0.3 | 93.1 | 0.2 | 0.6 |
| Comparative Example 1 | 259 | 314 | 21.4 | x | 60.3 | 44.0 | 0.3 | 93.1 | 0.2 | 0.6 |
| Comparative Example 2 | 191 | 236 | 23.2 | x | 71.3 | 17.3 | 0.3 | 93.1 | 0.2 | 0.6 |

TABLE 3

| | Sheet heat resistance Color difference (b*) | | | | Moist-heat haze resistance 60° C. × 90% RH × 7 days | | | | Corrosion resistance 85° C. × 85% RH × 28 days |
|---|---|---|---|---|---|---|---|---|---|
| | Before thermal stability test | After thermal stability test | Δb* | Evaluation | Haze value before start of moist-heat resistance test (%) | Haze value immediately after moist-heat resistance test (%) | Rise ratio (%) | Evaluation | |
| Example 1 | 0.3 | 1.1 | 0.8 | ○ | 0.4 | 0.6 | 50 | ○ | ○ |
| Example 2 | 0.3 | 1.2 | 0.9 | ○ | 0.4 | 0.8 | 100 | Δ | ○○ |
| Example 3 | 0.3 | 0.9 | 0.6 | ○ | 0.5 | 0.8 | 60 | ○ | ○○ |
| Example 4 | 0.2 | 2.1 | 1.9 | Δ | 0.4 | 0.5 | 25 | ○ | ○○ |
| Comparative Example 1 | 0.2 | 0.8 | 0.6 | ○ | 0.4 | 0.6 | 50 | ○ | x |
| Comparative Example 2 | 0.3 | 0.8 | 0.5 | ○ | 0.5 | 0.7 | 40 | ○ | x |

It was understood from Examples described above that the solvent-free acrylic adhesive of the present disclosure that included a large amount of the structural moiety derived from the hydroxy group-containing monomer (a1) in the acrylic resin (A), and that had an extremely small acid value was suppressed in viscosity rise due to heating, and was hence excellent in thermal stability, and had satisfactory corrosion resistance.

Meanwhile, each of the solvent-free acrylic adhesives of Comparative Examples each having a large acid value showed a large viscosity rise due to heating, and was hence poor in thermal stability. When any such solvent-free acrylic adhesive is used as a hot melt-type adhesive, the adhesive is reduced in applicability, and hence the physical properties of a coating film to be obtained are poor. Accordingly, a desired adhesive physical property is not obtained.

Although specific embodiments of the present disclosure have been described in Examples above, Examples are for illustrative purposes only and are not to be construed as limitative. It is intended that various modifications apparent to a person skilled in the art fall within the scope of the present disclosure.

The solvent-free acrylic resin composition of the present disclosure is excellent in thermal stability, and can be thickly applied. Accordingly, when the composition is turned into an adhesive, the adhesive is excellent in step followability, and is excellent in corrosion resistance and moist-heat haze resistance. Accordingly, the composition is useful in an adhesive, an impact-absorbing sheet, or the like to be used in each of, for example, a touch panel and an image display apparatus.

The invention claimed is:

1. A solvent-free acrylic resin composition, comprising an acrylic resin (A), and
a monocarbodiimide compound (b1),
wherein the acrylic resin (A) contains 8 wt. % to 30 wt. % of a structural moiety derived from a hydroxy group-containing monomer (a1),
wherein a content of the monocarbodiimide compound (b1) is from 0.01 parts by weight to 10 parts by weight with respect to 100 parts by weight of the acrylic resin (A), and
wherein an acid value in the resin composition is from 0.001 mgKOH/g to 0.3 mgKOH/g.

2. The solvent-free acrylic resin composition according to claim 1, wherein the acrylic resin (A) contains 5 wt. % to 40 wt. % of a structural moiety derived from at least one (meth)acrylate selected from the group consisting of methyl (meth)acrylate and ethyl (meth)acrylate.

3. The solvent-free acrylic resin composition according to claim 1, wherein the acrylic resin (A) has a weight-average molecular weight of 50,000 or more.

4. A solvent-free acrylic adhesive, which is obtained by using the solvent-free acrylic resin composition of claim 1.

5. An adhesive sheet, comprising an adhesive layer obtained by using the solvent-free acrylic resin composition of claim 1.

6. A production method for a solvent-free acrylic resin composition, comprising mixing
- an acrylic resin (A), which contains 8 wt. % to 30 wt. % of a structural moiety derived from a hydroxy group-containing monomer (a1), and which has an acid value of from 0.001 mgKOH/g to 2 mgKOH/g, and
- a monocarbodiimide compound (b1) wherein a content of the monocarbodiimide compound (b1) is from 0.01 parts by weight to 10 parts by weight with respect to 100 parts by weight of the acrylic resin (A), at a mixture temperature of from 0° C. to 140° C.

\* \* \* \* \*